April 11, 1967  M. C. KAYE  3,313,151
LOAD CELL
Filed July 26, 1965  2 Sheets-Sheet 1
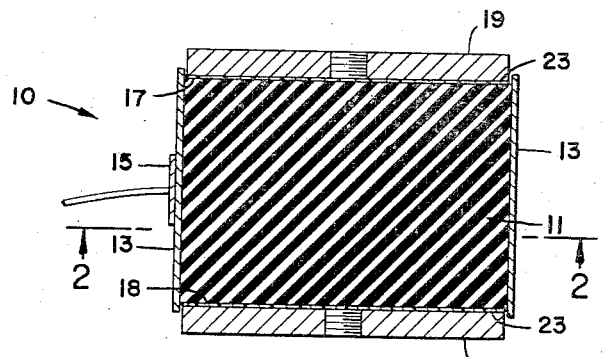
FIG_1
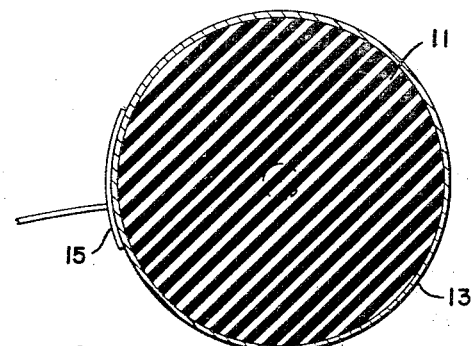
FIG_2
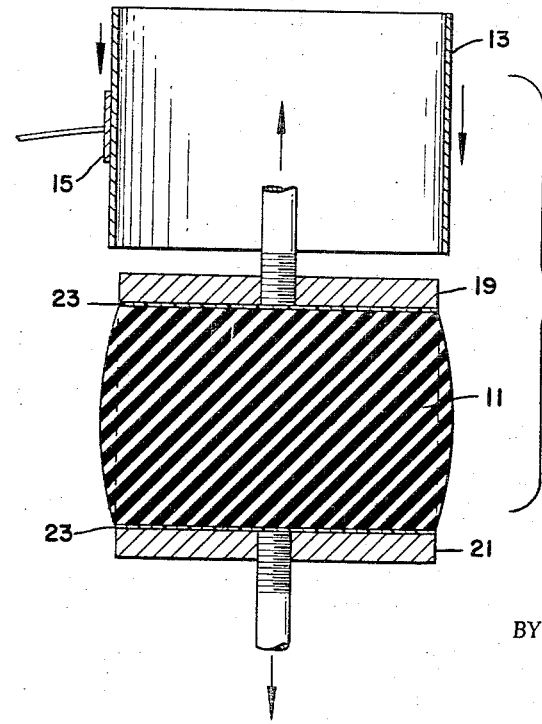
FIG_3
INVENTOR.
MICHAEL C. KAYE
BY
ATTORNEYS

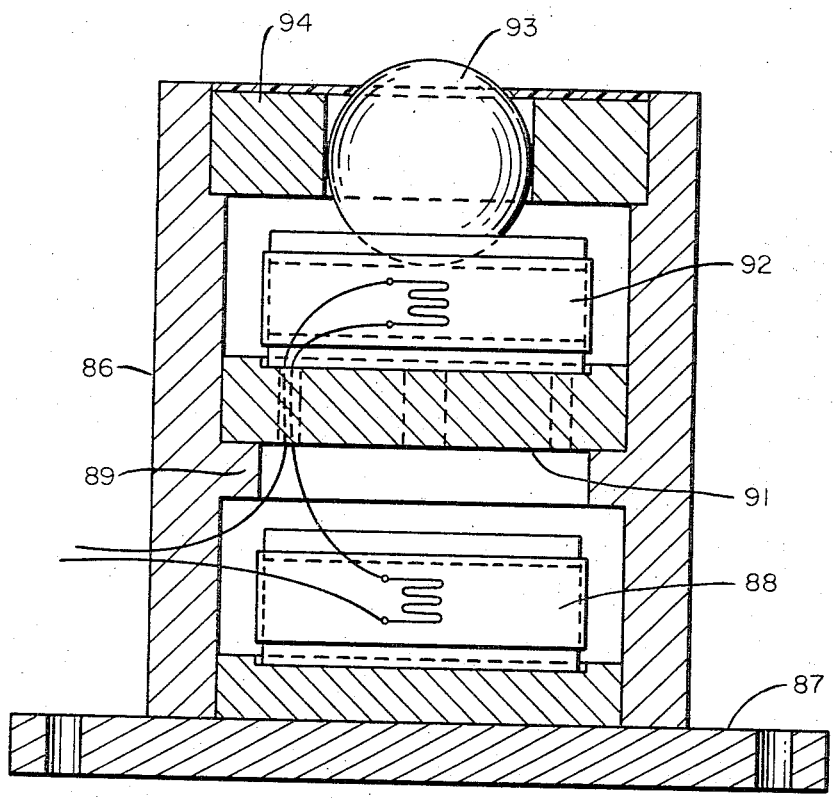
FIG_4

United States Patent Office 3,313,151
Patented Apr. 11, 1967

3,313,151
LOAD CELL
Michael C. Kaye, Portland, Oreg., assignor to Freightliner Corporation, Portland, Oreg., a corporation of Delaware
Filed July 26, 1965, Ser. No. 474,924
6 Claims. (Cl. 73—141)

This is a continuation-in-part of application Ser. No. 268,654, filed Mar. 28, 1963, now abandoned.

This invention relates generally to a load cell, and more particularly to a load cell for receiving and supporting a load, and providing an output signal which is proportional to the load being carried.

Load cells of the prior art have employed beams, columns, or other members for converting load into measurable strain as, for example, by expansion, contraction, compression, etc., of the member. A strain gauge having an electrical parameter which varies in response to strain is affixed to the member.

One type of such cell disclosed in the prior art has been a cell made of an elastomer core having encircling means forming the plates of a capacitor, including a pressure sensitive dielectric between the plates, and an air resistance pocket to provide the return force. Axial force applied to the cell changes the pressure on the dielectric and thus the value of the capacitor to give an indication of the load. Such device is not useful for measuring heavy loads of the order of thousands of pounds. Further, such a device is not useful in many applications since the change in capacitance as a function of load is non-linear throughout a portion of the range.

Another prior art device uses an elastomer core and a thick-walled ring surrounding the core. Strain gauges are attached to the ring. Load from seismic disturbances causes compression of the elastomer and consequent strain in the ring which is sensed by the gauges. Also, this prior art device has a significant portion of the elastomer unconfined by the ring, so that a large part of the effect of compression is to cause unconstrained bulging of the core. This results in a device which is also non-linear through a portion of the range and is, therefore, difficult to calibrate.

Therefore, it is an object of the present invention to provide an improved load cell which will overcome the above named disadvantages.

Another object of the invention is to provide a load cell of the above character which has a linear response to loads throughout its range.

Another object of the invention is to provide a load cell of the above character which is easy to manufacture.

Another object of the invention is to provide an improved load cell of the above character for use in weighing devices and more particularly in such devices which are required to have only a small deflection.

Another object of the invention is to provide a load cell of the above character which is accurate, and gives highly reproducible readings.

Another object of the invention is to provide an outut which can be calibrated to the applied load.

Another object of the invention is to provide a load cell of the above character which can be made in a small size.

Other objects and features of the invention will be apparent from the following description of a load cell and case when taken in conjunction with the accompanying drawings, of which:

FIGURE 1 is a cross-section view in elevation of a load cell constructed in accordance with the invention.

FIGURE 2 is a cross-section view of the load cell of FIGURE 1 taken along the line 2—2.

FIGURE 3 is an exploded view depicting the method of assembling the load cell of FIGURE 1.

FIGURE 4 is an elevational view partly in section of a compensated load cell assembly.

In general, the load cell 10 of the invention includes a cylindrical core 11 of elastomer which is surrounded by a cylindrical thin-walled gridle or shell 13 to which a strain gauge 15 is bonded. The relative sizes of the core 11 and shell 13 are such that the core prestresses the shell.

Referring now more particularly to FIGURES 1–3, the unmounted, relaxed core is a right circular solid cylinder having end faces 17 and 18 perpendicular to its axis, and barrel-shaped so that the midsection of the core is larger than the ends. The core 11 is made of any suitable solid elastomer having a high modulus of elasticity in the neighborhood of 90A durometer or more, such as polyurethane or neoprene.

End plates 19 and 21 of substantially the same diameter as the end faces 17 and 18 are bonded thereby by a suitable adhesive, such as an epoxy 23, or molded integrally. The plates 19 and 21 transmit the compressive forces to the core 11 and also distribute load forces equally over the end faces 17 and 18. The gap between the girdle or shell and the end plates is kept relatively small to minimize the bulging of the elastomer core.

The shell 13 is a right circular cylinder and is dimensioned relative to the core 11 so that the shell is prestressed by the core when it is installed to girdle the same. Thus as seen especially in FIGURE 3, the shell 13 has an inside dimension slightly larger in diameter or circumference than the end faces 17 and 18, and a smaller diameter or circumference than that of the midsection of the core.

The cylindrical shell 13 has a wall thickness which is very much smaller than its diameter. The shell 13 is constructed of material having relatively low modulus of elasticity, for adequate strain, and high yield strength. Preferred materials are aluminum or titanium.

The core and shell are assembled by applying an axial tensioning force to the core and slipping the shell over it. This can be conveniently done by threading pulling bars into holes provided in the end plates 19 and 21 and pulling in opposite directions to cause the elastomer core to stretch in tension and contract in cross-section, thereby permitting the shell to be slipped over the core. After the shell is positioned around the core, the applied tension is released, so that the core tries to assume its original shape; however, the shell restrains the core and is thereby prestressed.

The amount of prestress employed is sufficient if it causes the shell to behave as a cylindrical membrane having a purely hoop stress when under load. Under these conditions the shell will have substantially maximum cross sectional area. This can be more clearly understood by considering the effect of an initial load on a non-stressed shell. In such case, the initial load produces both a bending or radial stress (to overcome lack of true roundness) and a tangential or hoop stress (to resist circumferential stretching). The desired prestress is that which is sufficient to shape the shell into a cylindrical configuration so that no further bending stresses are encountered when a load is applied. Subsequent loading thus causes only tangential or hoop stress so that the shell is in pure tangential tension. By using this amount of prestress, subsequent tangential stress and strain are caused to be linearly related within the plastic limits of the shell material and therefore measurable without requiring corrections compensating for non-linearities. By way of example, a prestress sufficient to cause a strain in the shell from about 200–400 micro-inches per inch ($\mu\sigma=10^{-6}$) has been found satisfactory for the particular materials specified herein.

In final assembly, the load cell is seen to be dimensioned so that the core is completely supported circumferentially end to end by the shell and loaded across the entire surface of each of the ends. The total confinement of the core is particularly important so that loads transmitted to the end faces are fully converted into radial forces against the shell, there being no radially unsupported portions where the core could expand unimpeded. Also, it will be seen that the core is not attached to the shell, even though it laterally stresses it. Thus, the side extremes of the core can slip along the inner face of the shell as the cell operates. By this means, distortions of the core and non-linearities caused therefrom are avoided.

The following are examples of load cells constructed in accordance with the invention:

|  | I (normal) | II (high load) |
| --- | --- | --- |
| Height | 2″ | 3/4″. |
| Diameter | 2½″ | 2″. |
| Shell material | Aluminum | Titanium. |
| Shell thickness | .05″ | .05″. |
| Core | Urethane | Urethane. |
| Prestress | 300-400$\mu\sigma$ | 300-400$\mu\sigma$. |
| Strain gauge | 120-350 ohm resistance foil type having a length to width ratio of 2. | 120-350 ohm resistance foil type having a length to width ratio of 2. |

The load cell is constructed to measure compressive forces only and can be housed in any suitable housing which permits transfer of the load to the cell as a compressive force.

When the particular application of the load cell requires prolonged use in which variation in temperature or other quantities affecting the performance of the cell, suitable means for compensating for these variations can be provided. One suitable means is to employ an inactive, unloaded cell of the same type as the active, loaded cell, positioned in close proximity to the active cell and having its strain gauge connected in a suitable bridge circuit for cancelling out such variations.

An assembly providing a loaded or active and an unloaded or inactive cell is illustrated in FIGURE 4. The unit includes a cylindrical case 86 mounted on base 87. A reference or compensation cell 88 of the type described is housed in the lower portion of the case. A rim or ledge 89 carries a support 91 for the active or loaded cell 92. The active cell is engaged by a ball 93 which is retained by a ring 94. The interior of the case may be filled with grease to form a heat sink. The ball applies the load in a substantially vertical direction.

I claim:

1. A load cell for use in measuring forces applied thereto comprising a substantially cylindrical core of elastomer, a thin-walled substantially cylindrical shell of imperfectly circular cross section as manufactured surrounding said core, said core having a relaxed circumference at its midsection greater than the inner circumference of said shell, said shell normally prestressing said core an extent forcing said shell into a configuration wherein, considered in cross section, the area within said shell is a maximum in relation to the circumferential length of the shell, with the said shell behaving as a cylindrical membrane exhibiting tangential stress and substantially no bending stress in order to provide linear tangential strain in the shell for stress occurring in said core, and means operatively connected to said shell for developing a signal responsive to strains induced therein, the prestressing of said core being sufficient to induce a strain greater than 200 micro-inches/inch.

2. A load cell assembly comprising a core of elastomer having a substantially circular cross section, a substantially cylindrical shell encircling said core, said shell having an unstressed cross section which is not perfectly circular due to imperfection in manufacturing, said core having a relaxed diameter sufficiently greater than the inside diameter of the shell to cause said core to be normally prestressed into a linear operating region when said shell is placed over the core wherein the prestressed core forces said shell into a configuration having a substantially maximum circular cross sectional area with the shell behaving as a cylindrical membrane exhibiting tangential stress and substantially no bending stress in order to provide linear tangential strain in said shell for stress produced in said core, and a transducer mounted on said shell to give an electrical indication of the strain induced in said shell when said core is subsequently stressed, said prestressing being greater than 200 micro-inches/inch.

3. A load cell assembly comprising a core of elastomer having a substantially circular cross section, a substantially cylindrical shell encircling said core, said shell having an unstressed cross section which is not perfectly circular due to imperfection in manufacturing, said core having a relaxed diameter sufficiently greater than the inside diameter of the shell to cause said core to be normally prestressed into a linear operating region when said shell is placed over the core wherein the prestressed core forces said shell into a configuration having a substantially maximum circular cross sectional area with the shell behaving as a cylindrical membrane exhibiting tangential stress and substantially no bending stress in order to provide linear tangential strain in said shell for stress produced in said core, a transducer mounted on said shell to give an electrical indication of the strain induced in said shell when said core is subsequently stressed, rigid thrust transmitting end plates bearing on the ends of said core, said shell substantially confining said core between said end plates in closely surrounding relation to the periphery of each of said end plates to prevent expulsion of said core between said shell and said end plates which would cause non-linearity of shell strain as said core is stressed by pressure on the end plates.

4. A load cell assembly comprising a core of elastomer having a substantially circular cross section, a shell having an imperfectly circular cross section encircling said core, said core having a relaxed diameter sufficiently greater than the inside diameter of the shell to cause said core to be normally prestressed when said shell is placed over the core forcing said shell to behave as a cylindrical membrane exhibiting tangential stress and substantially no bending stress, said shell having a substantially circular cross section as a result of the prestressed core contained therewithin exerting outward radial force towards said shell forcing said shell to assume said circular cross section, rigid thrust transmitting end plates bearing on the ends of said core wherein said shell substantially confines said core between said end plates and is in close proximity to a periphery of each of said end plates to prevent a tendency toward expulsion of said core between said shell and said end plates with resultant nonlinearity of shell strain as said core is further stressed by pressure on an end plate, and a transducer mounted on said shell for providing an electrical indication of the strain induced in said shell when said core is subsequently stressed.

5. A device of the class described comprising
an elastomer core having end faces,
a metal girdle embracing said core in a direction parallel to said end faces,
said girdle projecting beyond said core in a direction normal to said end faces to provide a recessed portion next each such end face,
load bearing end plates occupying said recessed portions and bonded to the end faces of said core,
the peripheries of said end plates being in contiguous relation to said girdle so that said core is totally confined by said girdle and end plates whereby a compressive load imposed on said end plates is transmitted to said core and from said core to said girdle without any free distortion of said core, and sensing means for indicating the extent of expansion of said girdle as caused by forces applied to said core by said end plates, said girdle being substantially but not truly cylindrical because of the usual imperfections of manufacture, said core being oversize so that it is in a compressed condition in said girdle, the extent of oversize being such that said girdle is caused to expand an amount to eliminate all the bending stresses in said girdle.

6. A device of the class described comprising an elastomer core having end faces, a metal girdle embracing said core in a direction parallel to said end faces, said girdles projecting beyond said core in a direction normal to said end faces to provide a recessed portion next each such end face, load bearing end plates occupying such recessed portions and bonded to the end faces of said core, the peripheries of said end plates being in contiguous relation to said girdle so that said core is totally confined by said girdle and end plates whereby a compressive load imposed on said end plates is transmitted to said core and from said core to said girdle without any free distortion of said core, and sensing means for indicating the extent of expansion of said girdle as caused by forces applied to said core by said end plates, said girdle, core, end plates and sensing means comprising a first unit, there being a second unit similar to and disposed adjacent said first unit, the sensing means of the two units being operatively related to one another in a manner such that responses of the sensing means of one unit resulting from changes in dimensions as caused by temperature variations are cancelled out by the responses of the second unit to such temperature variations.

References Cited by the Examiner
UNITED STATES PATENTS

| | | | |
|---|---|---|---|
| 2,634,721 | 4/1953 | Greenwood | 73—398 X |
| 2,725,548 | 11/1955 | Harris | 73—398 X |
| 2,849,878 | 11/1955 | Adams | 73—88 |
| 2,986,927 | 6/1961 | Hundertmark | 73—88 |
| 2,998,585 | 8/1961 | Bodner et al. | 73—398 X |
| 3,021,747 | 2/1962 | Garrett. | |
| 3,153,772 | 10/1964 | Dorr. | |
| 3,210,993 | 10/1965 | Shoor et al. | 73—141 |

RICHARD C. QUEISSER, *Primary Examiner.*

C. A. RUEHL, *Assistant Examiner.*